United States Patent Office 3,461,064
Patented Aug. 12, 1969

3,461,064
PROCESS FOR REMOVING VANADIUM FROM CATALYSTS
Harry A. Hamilton, Natrona Heights, Howard G. McIlvried, Pittsburgh, and Raynor T. Sebulsky, Verona, Pa., assignors to Gulf Research & Development Company, Pittsburgh, Pa., a corporation of Delaware
No Drawing. Filed Apr. 28, 1967, Ser. No. 634,498
Int. Cl. B01j 11/70, 11/02
U.S. Cl. 208—213     10 Claims

ABSTRACT OF THE DISCLOSURE

A process for removing vanadium from a vanadium-containing catalyst which involves oxidizing the catalyst, treating the oxidized catalyst with an alcohol and separating the alcohol from the catalyst. The process can be employed to treat both fixed bed and fluid catalysts which are employed in catalytic hydrocarbon conversion processes.

BACKGROUND OF THE INVENTION

This invention relates to the removal of metal contaminants from catalysts. More particularly, this invention relates to the removal of vanadium from catalysts employed in the catalytic conversion of hydrocarbon stocks containing vanadium.

Petroleum stocks are known to contain varying amounts of many metals. In conventional catalytic refinery processes these metals in the hydrocarbon stocks deposit on the catalysts in a relatively non-volatile form, thereby markedly altering the activity and selectivity of the catalysts. Of the metallic contaminants present in hydrocarbon stocks, nickel and vanadium are most common, although other metals including iron, copper, sodium, etc. are often present. These metallic contaminants may be present in the hydrocarbonaceous material in a variety of forms such as metal oxides or sulfides, metallic scale or particles, soluble salts, or they may be found to exist as organometallic compounds of relatively high molecular weight.

Petroleum processing catalysts frequently require treatment for the removal of vanadium. This is because the vanadium present in various crudes and their fractions tends to deposit upon catalysts employed for their treatment, thereby tending seriously to contaminate these catalysts. Vanadium is a particularly deleterious contaminant upon such catalysts since it drastically alters their activity and selectivity. For example, in cracking processes, when vanadium accumulates on the surface of the catalyst, the catalyst produces a smaller proportion of hydrocarbons in the gasoline boiling range and produces a greatly increased amount of carbon and coke. In catalytic hydrodesulfurization processes, where sulfur removal is of prime importance and the activity of the catalyst is measured by its ability to desulfurize (see for example U.S. Patent No. 2,769,758), contamination of the catalyst with metals such as vanadium severely inhibits the catalyst from performing its designated function. This loss of catalyst activity caused by the deposition of excessive amounts of vanadium from charge stocks is due, at least in part, to plugging of catalyst pores, thereby greatly reducing the available catalytic surface area.

Because metallic contaminants, and in particular vanadium, reduce the activity and selectivity of hydrocarbon conversion catalysts, it is desirable to formulate procedures whereby these metallic contaminants can be removed from the catalysts, thereby restoring the catalysts to substantially their original activity. In addition, it is also desirable to devise methods whereby catalysts are restored to their original activity without removing substantial amounts of the functional components of the catalyst. In accordance with these and other objectives, we have discovered a new and improved, selective process for removing vanadium from hydrocarbon conversion catalysts, thereby restoring the catalysts to substantially their original activity, without removing functional components from the catalysts.

SUMMARY OF THE INVENTION

Briefly, our invention comprises contacting a vanadium-contaminated hydrocarbon conversion catalyst with an oxygen-containing gas, treating the oxygen-contacted, vanadium-contaminated catalyst with an alcohol containing at least one hydroxy group, and thereafter separating the alcohol from the catalyst.

DESCRIPTION OF THE INVENTION

As stated previously, our invention is applicable to catalysts employed in catalytic hydrocarbon conversion processes. It is to be further understood that our invention is applicable to both fixed bed and fluidized bed catalytic processes. These conversion processes may include catalytic hydrocracking, catalytic hydrodesulfurization and catalytic hydrogenation of hydrocarbon stocks. Thus, the feed stocks to which the reactivated catalysts of our invention may be employed include furnace oils, naphtha cracking charge stock, shale oils, coke-oven heavy gas oils, and residue-containing hydrocarbons such as whole crude or reduced crude. Accordingly, the technique of our invention for removing vanadium from contaminated catalysts can be incorporated as an integral part of a hydrocarbon processing scheme such as, for example, in the catalyst regeneration portion of a cracking, hydrodesulfurization or hydrocracking process.

The catalysts to which our invention is applicable include any of the well known hydrocarbon processing catalysts such as, for example, refractory metal oxides either alone or in admixture with each other, as well as dual functional catalysts generally comprising a hydrogenating component composited with a cracking component which is generally the support for the hydrogenating component. Therefore, our invention is applicable to both single and dual functional catalysts which can be supported on a carrier which is either inert or active. Illustrative of refractory metal oxide catalysts are alumina, silica, silica-alumina and other combinations of such oxides, for example silica-alumina-zirconia, silica-alumina-titania, silica-magnesia, zirconia-silica, titania-silica and alumina-magnesia-silica. Dual functional catalysts generally comprise a minor proportion of a metalliferous hydrogenating component such as, for example, Group VI and Group VIII metals of the Periodic Table, their oxides or sulfides, supported on a carrier such as alumina, silica-alumina, kieselguhr or fuller's earth. Additionally, such dual functional catalysts can also contain a minor quantity of a promoter such as, for example, a halogen, particularly fluorine. We have found that our invention is particularly suitable when applied to catalysts comprising mixtures of nickel and tungsten, and mixtures of nickel, cobalt and molybdenum as well as either platinum or palladium alone or in combination with other metals supported on either alumina or silica-alumina. These catalysts can also be promoted with a small amount of a halogen.

We have found that in removing vanadium contaminants from hydrocarbon conversion catalysts with an alcohol it is necessary first to oxidize the catalyst. It is believed that this initial oxidation raises the oxidation state of the vanadium present on the catalyst, thereby facilitating its removal with an alcohol in the form of vanadic esters having the general formula $R_3VO_4$. In some instances, the oxidation also converts the vanadium from some other state, for example a sulfide to the oxide state. It is speculated that under optimum oxidizing conditions the vanadium present in the catalyst is transformed to the $V^{+5}$ valance state. However, it is not critical to the operativeness of this invention that all the vanadium be oxidized to this state and the vanadium may exist at other oxidation levels such as $V^{+4}$, i.e., $V_2O_4$, during treatment with the alcohol.

The oxidation of the catalyst may be accomplished by any standard method employing a suitable oxidizing agent as, for example, air, mixtures of oxygen gas and an inert carrier gas such as nitrogen, or a liquid oxidizing agent such as a solution of ammonium perchlorate. We have found that standard regeneration methods currently employed in petroleum refining are quite acceptable in accomplishing the objects of the present invention. Therefore, in oxidizing a catalyst employed in a fixed bed hydrocarbon conversion process, the catalyst may be oxidized simply by shutting off the flow of hydrocarbons to the conversion reactor and thereafter introducing a regenerating gas into the reactor such as, for example, a mixture of nitrogen and oxygen or air. Usually, when regenerating a coked catalyst, treatment for a period of time sufficient to remove substantially all of the carbon from the catalyst will provide adequate oxidation for the purposes of our invention. In some cases, the catalyst can be contacted with the oxidizing gas for a period of from about one hour to about six hours. Temperatures employed during the regeneration can range from about 650° F. up to about 1200° F., and preferably from about 900° F. to about 1050° F., e.g., about 950° F. Regeneration temperatures above 1050° F. should be employed with caution, since temperatures above this limit may thermally damage the catalyst. After the catalyst has been contacted with an oxygen-containing gas for a suitable period of time, the flow of regeneration gas to the reactor is stopped, and the catalyst is then contacted with an alcohol.

If desired, multiple oxidation steps can be employed with our invention. That is, the catalyst can be oxidized by the regeneration method set out above. The catalyst can then be cooled, if desired, by passing an inert medium such as air or nitrogen over the catalyst and thereafter contacting it with an alcohol and this step in turn can be followed by another oxidation treatment which can be of the same type as the first, i.e., regeneration with an oxygen-containing gas, or if desired a liquid oxidizing agent may be employed, as for example ammonium perchlorate.

After the catalyst has been oxidized to raise the oxidation state of the vanadium present on the catalyst, the catalyst is then contacted with an alcohol containing at least one hydroxy group. The alcohol can be aliphatic in nature, as for example methyl alcohol, ethyl alcohol or isopropyl alcohol. We have also found that aromatic alcohols can be employed in our invention, as for example phenol and cresol. In addition, if desired, alcohols containing more than one hydroxy group, such as ethylene glycol, can be employed. The choice of alcohol to be used as the treating agent will depend on such factors as the amount of vanadium present on the contaminated catalyst, the availability of bulk quantities of alcohol for use in large scale refinery runs and the economic feasibility of employing a particular alcohol. Thus, in a full scale refinery run it is desirable to employ an alcohol which is readily accessible at a relatively inexpensive cost and easy to handle. We have found lower aliphatic alcohols containing from 1 to 12 carbon atoms to be especially useful.

In operations employing fixed bed catalysts it is not necessary to remove the catalyst from the reactor before contacting the catalyst with the alcohol. The alcohol is pumped directly into the reactor unit and contacted with the catalyst for a sufficient time so as to form vanadic esters believed to be of the general formula $R_3VO_4$. Operating conditions for such treatment should employ temperatures and pressures so that the alcohol remains preferably in the liquid state. We have found that if the alcohol is vaporized, relatively smaller quantities of vanadium are removed. Temperatures which can be employed range from about 80° F. to 450° F., and preferably from about 170° F. to about 250° F. Although the pressure employed during alcohol contact with the catalyst is not necessarily limiting in our invention, it is advantageous to employ a pressure above the vapor pressure of the alcohol being employed, since it is desirable to maintain the alcohol in the liquid phase. Preferred pressures are from about 0 p.s.i.g. to about 1000 p.s.i.g. Contact time for the alcohol treatment can be from about 15 minutes to about 24 hours, and preferably from about 30 minutes to about 4 hours. Alcohol to catalyst ratios can be from about 10 ml./gram to about 100 ml./gram and preferably about 50 ml./gram.

After the catalyst has been contacted with an alcohol for a sufficient period of time the alcohol is separated from the catalyst by any known standard procedure such as draining or decantation. As stated previously, the by-product which results from the treatment of a vanadium-containing catalyst with an alcohol is believed to be in the form of a vanadic ester having the general formula $R_3VO_4$. Vanadic esters of this type are further described in Sidgwick, vol. 1, Chemical Elements and Their Compounds, 1950, at pages 812–813. If desired, the vanadium contained in the by-product may be recovered by distilling off excess alcohol and thermally decomposing the remaining by-product.

Our invention will be further described by the following illustrative examples.

Example I

A nickel-cobalt-molybdenum on alumina catalyst contaminated with vanadium was subjected to an oxidative regeneration treatment in air at a temperature of about 950° F. for sufficient time to remove substantially all carbon from the catalyst. Analysis of the catalyst after the oxidative treatment indicated a metals content of 2 percent by weight nickel, 1.1 percent by weight cobalt, 10.0 percent by weight molybdenum and 7.4 percent by weight vanadium with the balance alumina.

A five gram sample of this catalyst was then contacted with 250 ml. of ethanol at a temperature of about 173° F. and at atmospheric pressure for approximately four hours. After the four hour contact period and separation of the ethanol from the catalyst, analysis of the catalyst showed a metals content of 2.4 percent by weight nickel, 1.3 percent by weight cobalt, 9.8 percent by weight molybdenum and 4.3 percent by weight vanadium, or a reduction in vanadium content of approximately 41.9 percent by weight. The slight increase in percentage of nickel and cobalt found in product analysis was attributed to limitations in the X-ray analysis method employed.

From the data obtained on product analysis it can be seen that the ethanol treatment removed substantial amounts of vanadium without removing any substantial amounts of the functional components of the catalyst. It is of particular significance to note that only 2 percent by weight of molybdenum initially present was removed from the catalyst. Due to the similarity in chemistry of molybdenum and vanadium one would expect these two metals to behave substantially in the same manner when contacted with an alcohol. Indeed, other prior art methods which teach the removal of vanadium from catalysts containing molybdenum and other metalliferous hydrogenating components have the limitation that substantial quantities of molybdenum are removed along with the vanadium. Therefore, it can be seen that our process has significance not only from the standpoint of substantial vanadium removal but also from the unexpected and highly desirable showing that functional components of the catalysts are not removed.

Example II

A ten gram sample of the air regenerated catalyst of Example I was contacted with 250 ml. of ethanol for approximately 1 hour under the same conditions of temperature and pressure as Example I. Analysis of the catalyst after contact with and removal of the ethanol showed 1.8 percent by weight nickel, 1.0 percent by weight cobalt, 8.1 percent by weight molybdenum and 5.2 percent by weight vanadium, or a reduction of 29.7 percent by weight of vanadium. This product was then further subjected to air regeneration at 1200° F. for approximately 3 hours and thereafter contacted with 250 ml. ethanol for approximately 1 hour at a temperature of about 173° F. and atmospheric pressure. Product analysis showed a metals content of 1.7 percent by weight nickel, 0.9 percent by weight cobalt, 8.1 percent by weight molybdenum and 2.9 percent by weight vanadium, or a 60.8 percent by weight reduction in the overall vanadium content of the charge catalyst. Again, as in Example I, the functional components of the catalyst were left substantially intact on the alumina support.

Example III

Another ten gram sample of the air regenerated catalyst of Example I was contacted with 100 grams of phenol at a temperature of about 360° F. and atmospheric pressure for approximately 1 hour. The treated catalyst charge had a metals content of 2.2 percent by weight nickel, 1.3 percent by weight cobalt, 9.3 percent by weight molybdenum and 5.8 percent by weight vanadium, that is, 21.6 percent by weight of the vanadium initially present was removed. As in Examples I and II the functional components of the catalyst were left substantially intact on the alumina support.

Example IV

Comparison runs were made with alcohols of varying molecular weight to determine their respective effectiveness in removing vanadium from a vanadium-contaminated catalyst. The runs were conducted in an autoclave at a temperature of 250° F. and autogenous pressure with 5 grams of catalyst and 250 ml. of alcohol being employed in each run. The quantity of alcohol employed was sufficient to insure maintenance of a substantial quantity of alcohol in the liquid state. The metals contents of the treated catalyst were determined and are summarized in Table I.

TABLE I

| Catalyst | Ni, wt. percent | Co, wt. percent | Mo, wt. percent | V, wt. percent | Metals remaining in alcohol after treatment, p.p.m. |
|---|---|---|---|---|---|
| Catalyst charge | 2.0 | 1.1 | 10.0 | 7.4 | V |
| After treatment with methanol | 2.3 | 1.3 | 10.0 | 3.7 | 1,177 |
| After treatment with ethanol | 2.3 | 1.3 | 10.4 | 4.0 | 1,134 |
| After treatment with isopropanol | 2.4 | 1.3 | 10.4 | 4.6 | |

From the data contained in Table I it will be seen that all of these alcohols are effective for removing vanadium from the catalyst; although as the molecular weight of the alcohol increases, the percentage of vanadium removed decreases slightly.

Example V

Runs were made comparing the effectiveness of a fresh catalyst, a vanadium-contaminated catalyst which had only been regenerated, and a vanadium-contaminated catalyst which had been subjected to regeneration and the alcohol treatment of this invention, for removing sulfur from a sulfur containing hydrocarbon stock. The catalyst employed was nickel-cobalt-molybdenum distended on a 10–20 mesh alumina and contained 0.5 percent Ni, 1.1 percent Co, and 8.1 percent Mo based on the weight of the finished catalyst. The hydrocarbon feedstock was a blend of 80 volume percent Kuwait light gas oil and 20 volume percent xylene. Process conditions were 650° F., 600 p.s.i.g., 400 s.c.f. $H_2$/bbl. and 1 LHSV based on the gas oil. The sulfur content was 2.02 percent by weight of the feed. The results of these runs are summarized in Table II.

TABLE II

| | Sulfur remaining in hydrocarbon product, percent by wt. | | | | |
|---|---|---|---|---|---|
| | Hours on stream | | | | |
| Catalyst | 4-8 | 8-12 | 12-16 | 16-20 | Avg. |
| Fresh catalyst | 0.94 | 0.87 | 0.86 | 0.81 | 0.87 |
| Catalyst reactivated by 950° F. regeneration followed by 4 hr. contact with liquid ethanol | 0.86 | 0.87 | 0.84 | 0.87 | 0.85 |
| Catalyst reactivated by 950° F. regeneration and no alcohol treatment | 1.04 | 1.12 | 1.18 | 1.10 | 1.11 |

From the data contained in Table II it will be seen that the vanadium-contaminated catalyst which had been reactivated by regeneration followed by contact with ethanol was restored to substantially its original activity, while the vanadium-contaminated catalyst which received regeneration only had a substantially lower activity as evidenced by the higher percentage of sulfur remaining in the hydrocarbon product.

Example VI

Determinations similar to those of Example V were made with the additional comparison of a vanadium-contaminated catalyst which had been treated by contact with ethanol for 4 hours followed by regeneration at 950° F. The catalyst employed was a $\frac{1}{16}''$ alumina extrudate and contained 0.6 percent Ni, 1.1 percent Co and 8.9 percent Mo based on the weight of the finished catalyst. The charge stock was a blend of 80 volume percent Kuwait light gas oil and 20 volume percent xylene having a sulfur content of 1.95 percent by weight of the feed. Process conditions were identical to those of Example V. The results of these determinations are summarized in Table III.

TABLE III

| Catalyst | Sulfur remaining in hydrocarbon product, percent by wt. | | | | |
|---|---|---|---|---|---|
| | Hours on stream | | | | |
| | 4-8 | 8-12 | 12-16 | 16-20 | Avg. |
| Fresh catalyst | 0.86 | 0.92 | 0.94 | 0.92 | 0.91 |
| Catalyst reactivated by 950° F. regeneration followed by 4 hr. contact with liquid ethanol: | | | | | |
| Run No. 1 | 0.90 | 0.90 | 0.92 | 0.97 | 0.92 |
| Run No. 2 | 0.90 | 0.86 | 0.82 | 0.79 | 0.84 |
| Catalyst receiving a 950° F. regeneration and no alcohol treatment. | 1.09 | 1.12 | 1.08 | 1.13 | 1.11 |
| Catalyst treated by 4 hr. contact with liquid ethanol followed by 950° F. regeneration. | 1.05 | 1.04 | 1.07 | 1.10 | 1.07 |

From the foregoing data it will be seen, as in Example V, that the vanadium-contaminated catalyst which received regeneration followed by contact with liquid ethanol was reactivated to substantially its original activity as evidenced by the percentage of sulfur remaining in the hydrocarbon product. In addition it will be noted that the regeneration step must precede the alcohol treatment, and if this sequence is not followed, the catalyst does not regain its original activity, and results are obtained similar to those for a catalyst which is not given an alcohol treatment.

It is to be understood that the above indicated examples are illustrative only and are not intended as limiting the scope of the invention. Thus there can be substituted in the foregoing examples other catalysts and supports, alcohols, hydrocarbon feedstocks and process conditions, all as disclosed herein.

We claim:

1. A process for removing vanadium from a vanadium-containing catalyst which comprises:
   (a) oxidizing the vanadium-containing catalyst,
   (b) contacting the oxidized catalyst with an alcohol containing at least one hydroxy group at a temperature and pressure selected to maintain said alcohol in the liquid state and thereafter,
   (c) separating the alcohol from the catalyst.

2. The process of claim 1 wherein the catalyst is comprised of an active hydrogenating component selected from the group consisting of Group VI and Group VIII metals, their oxides and sulfides.

3. The process of claim 2 wherein the active hydrogenating components of the catalyst are supported on a refractory metal oxide.

4. The process of claim 1 wherein the catalyst is nickel-cobalt-molybdenum supported on alumina.

5. The process of claim 1 wherein the alcohol is a lower aliphatic alcohol containing from 1 to 12 carbon atoms.

6. The process of claim 1 wherein the vanadium-containing catalyst is contacted with an oxygen-containing gas at a temperature from about 650° F. to about 1200° F.

7. The process of claim 1 wherein the temperature and pressure selected to maintain the alcohol in the liquid state are from 80° F. to about 450° F. and from about 0 p.s.i.g. to about 1000 p.s.i.g. respectively.

8. The process of claim 1 wherein the vanadium-containing catalyst has become contaminated with vanadium due to the use of the catalyst in the treatment of a vanadium-containing hydrocarbon feed stock.

9. The process of claim 1 wherein the catalyst from which the alcohol has been separated in step (c) is reoxidized, the reoxidized catalyst is contacted with an alcohol containing at least one hydroxy group at a temperature and pressure selected to maintain said alcohol in the liquid state and thereafter separating the alcohol from the catalyst.

10. A process for the catalytic conversion of a vanadium-containing hydrocarbon which comprises:
   (a) contacting the vanadium-containing hydrocarbon with a catalyst at elevated temperatures and pressures,
   (b) discontinuing the contacting of the vanadium-containing hydrocarbon with the catalyst,
   (c) oxidizing the catalyst,
   (d) contacting the oxidized catalyst with an alcohol containing at least one hydroxy group at a temperature and pressure selected to maintain said alcohol in the liquid state,
   (e) separating the alcohol from the catalyst and thereafter,
   (f) recontacting the hydrocarbon with the catalyst.

References Cited

UNITED STATES PATENTS

| 1,403,198 | 1/1922 | Robinson | 252—414 |
| 3,151,088 | 9/1964 | Sanford et al. | 208—251 |

OTHER REFERENCES

Handbook of Chemistry, Lange (1956), pp. 326-327.

DELBERT E. GANTZ, Primary Examiner

J. M. NELSON, Assistant Examiner

U.S. Cl. X.R.

208—113, 251; 252—414, 416